(12) United States Patent
Yoon

(10) Patent No.: US 12,041,018 B2
(45) Date of Patent: Jul. 16, 2024

(54) METHOD OF DISPLAYING SIMILAR CHAT ROOMS, METHOD OF DISPLAYING CHAT ROOM GROUP, AND USER TERMINAL

(71) Applicant: SAMSUNG SDS CO., LTD., Seoul (KR)

(72) Inventor: Seung Hyun Yoon, Seoul (KR)

(73) Assignee: SAMSUNG SDS CO., LTD., Seoul (KR)

(\*) Notice: Subject to any disclaimer, the term of this patent is extended or adjusted under 35 U.S.C. 154(b) by 71 days.

(21) Appl. No.: 17/826,465

(22) Filed: May 27, 2022

(65) Prior Publication Data
US 2022/0385602 A1    Dec. 1, 2022

(30) Foreign Application Priority Data
May 28, 2021    (KR) .................. 10-2021-0069153

(51) Int. Cl.
*H04L 51/216*    (2022.01)
*G06F 3/0482*    (2013.01)
*G06F 16/9538*    (2019.01)
*H04L 51/04*    (2022.01)

(52) U.S. Cl.
CPC ............ *H04L 51/04* (2013.01); *G06F 3/0482* (2013.01); *G06F 16/9538* (2019.01); *H04L 51/216* (2022.05); *G06F 2203/04803* (2013.01)

(58) Field of Classification Search
CPC ............... G06F 3/0482; G06F 16/9538; G06F 2203/04803; H04L 51/04; H04L 51/216
See application file for complete search history.

(56) References Cited

U.S. PATENT DOCUMENTS

| | | | |
|---|---|---|---|
| 8,015,246 B1* | 9/2011 | Anderson | H04L 12/1827 709/204 |
| 8,458,197 B1* | 6/2013 | Procopio | G06F 16/30 707/749 |
| 8,843,835 B1* | 9/2014 | Busey | H04L 63/0421 715/854 |
| 10,915,866 B2* | 2/2021 | Bay | H04L 51/42 |
| 11,281,358 B2* | 3/2022 | Li | G06F 3/0482 |
| 11,500,951 B1* | 11/2022 | Shetty | H04L 51/216 |
| 2003/0195928 A1* | 10/2003 | Kamijo | H04L 12/1818 709/204 |
| 2006/0174207 A1* | 8/2006 | Deshpande | G06Q 10/107 715/758 |
| 2018/0367325 A1* | 12/2018 | Jang | H04L 67/306 |
| 2019/0173812 A1* | 6/2019 | Higgins | H04L 51/04 |
| 2020/0014641 A1* | 1/2020 | Kwon | H04L 51/216 |

(Continued)

FOREIGN PATENT DOCUMENTS

| | | |
|---|---|---|
| CN | 109033386 B | 4/2020 |
| KR | 10-1631287 B1 | 6/2016 |

(Continued)

*Primary Examiner* — Dino Kujundzic
(74) *Attorney, Agent, or Firm* — Sughrue Mion, PLLC

(57) ABSTRACT

A method of displaying similar chat rooms according to an embodiment of the present disclosure is performed by a user terminal. The method includes, in response to a gesture input received for a specific chat room in a chat room list displayed on a screen, acquiring a list of similar chat rooms having a high degree of similarity with the specific chat room in the chat room list, and displaying the similar chat room list.

18 Claims, 12 Drawing Sheets

(56) References Cited

U.S. PATENT DOCUMENTS

2020/0036831 A1\* 1/2020 Kim .................. H04L 67/306
2021/0208752 A1\* 7/2021 Hwang ................ H04L 51/02
2021/0258181 A1\* 8/2021 Han .................... G06Q 50/30

FOREIGN PATENT DOCUMENTS

| KR | 10-1910581 B1 | 10/2018 |
| KR | 10-2019-0092086 A | 8/2019 |
| KR | 10-2020-0020192 A | 2/2020 |

\* cited by examiner

METHOD OF DISPLAYING SIMILAR CHAT ROOMS, METHOD OF DISPLAYING CHAT ROOM GROUP, AND USER TERMINAL

CROSS-REFERENCE TO RELATED APPLICATION AND CLAIM OF PRIORITY

This application claims the benefit under 35 USC § 119 of Korean Patent Application No. 10-2021-0069153 filed on May 28, 2021, in the Korean Intellectual Property Office, the entire disclosure of which is incorporated herein by reference for all purposes.

BACKGROUND

1. Field of the Disclosure

The present disclosure relates to a method of displaying similar chat rooms, a method of displaying a chat room group, and a device for implementing the same, and more particularly, to a similar chat room display method of displaying chat rooms which are similar to a chat room selected by a user, a chat room group display method of displaying a chat room group including a plurality of chat rooms selected by a user, and a device for implementing the same.

2. Description of the Related Art

Messenger services have a characteristic that several participants join a chat room and talk to each other for a short time and then the chat room is deleted after a certain time.

According to the related art, to find the content of each chat room in a chat room list of a messenger, a user generally filters chat rooms with a search word first, visits each chat room, moves to a point at which the search word is detected through scrolling, and finds the content.

However, such a method involves detecting a desired conversation by searching for a specific term and has shortcomings in that the number of chat rooms increases, and the more general the term, the more time and effort it takes to find a desired conversation.

Particularly, in the case of a job messenger, several chat rooms with similar names are made for job conversations. However, only the number of participants in each chat room is displayed, and it is difficult to know what kind of participants are communicating for what purpose in each chat room.

Also, a search word may be input for a search to find the content of main conversations held on the job in several chat rooms. However, there is only a method of joining each chat room and doing a search, and in several chat rooms, it is difficult to find main conversations held on the job in the past or detect a desired conversation at once.

Accordingly, a method is required for collectively showing chat rooms including main conversation content wanted by a user in a chat room list of a messenger and easily understanding the purpose of each chat room and the flow of conversations.

SUMMARY

Aspects of the present disclosure provide a similar chat room display method and a chat room group display method for collectively showing chat rooms including main conversation content wanted by a user in a chat room list of a messenger and a device for implementing the same.

Aspects of the present disclosure also provide a similar chat room display method and a chat room group display method for collectively showing chat rooms having similar conversational context and participant information to a chat room specified by a user in a chat room list of a messenger and a device for implementing the same.

Aspects of the present disclosure also provide a similar chat room display method and a chat room group display method for generating one chat room group from chat rooms selected by a user in a chat room list of a messenger to do a rapid search and a device for implementing the same.

It should be noted that objects of the present disclosure are not limited to the above-described objects, and other objects of the present disclosure will be apparent to those skilled in the art from the following descriptions.

According to an aspect of the inventive concept, there is provided a method of displaying similar chat rooms performed by a user terminal. The method includes, in response to a gesture input received for a specific chat room in a chat room list displayed on a screen, acquiring a list of similar chat rooms having a high degree of similarity with the specific chat room in the chat room list, and displaying the similar chat room list.

The acquiring of the list of the similar chat rooms having a high degree of similarity with the specific chat room may include calculating a similarity index, which represents a degree of similarity with the specific chat room, for each of chat rooms included in the chat room list, and extracting the similar chat rooms having a high degree of similarity with the specific chat room using the calculated similarity indices.

The similarity indices may be calculated by analyzing one or more items among conversation content, user participation, participant similarity, and recent activity history.

The similarity indices may be calculated by giving different weights to the one or more items.

The displaying of the similar chat room list may include displaying the similarity index for each of the similar chat rooms in combination with information on the items analyzed for calculating the similarity index.

The displaying of the similar chat room list may include displaying the similar chat room list adjacent to a lower end of the specific chat room.

The method may further include, when one similar chat room is selected in the similar chat room list, displaying main conversation content of the selected similar chat room in a separate popup area.

The displaying of the main conversation content of the selected similar chat room in the separate popup area may include analyzing a conversation pattern of the similar chat room using conversation types and conversation frequencies of all participants of the similar chat room, and extracting the main conversation content on the basis of the analyzed conversation pattern.

The conversation pattern of the similar chat room may be classified into a notification and aggregation type, a business report type, a question-and-answer type, or a file transmission type.

The displaying of the main conversation content of the selected similar chat room in the separate popup area may include classifying terms not related to business, slang, and meaningless answers in entire conversation content of the similar chat room into a blacklist and excluding the blacklist from the main conversation content.

The displaying of the main conversation content of the selected similar chat room in the separate popup area may include classifying schedules, referential people, and conversations of main members in entire conversation content of the similar chat room into a whitelist and including the whitelist in the main conversation content.

The method may further include, when at least one similar chat room is selected in the similar chat room list, displaying a graphical user interface (GUI) for performing an additional function on the selected at least one similar chat room.

The additional function may include deselection, save, and bookmark functions for the selected similar chat room.

The method may further include, when a plurality of similar chat rooms are selected in the similar chat room list, generating and displaying a similar group chat room including the selected plurality of similar chat rooms.

According to an aspect of the inventive concept, there is provided a method of displaying a chat room group performed by a user terminal. The method includes receiving an input for selecting a plurality of chat rooms in a chat room list displayed on a screen, and displaying a chat room group display screen including the selected plurality of chat rooms, wherein the plurality of chat rooms are displayed adjacent to each other in the chat room group display screen.

The plurality of chat rooms may be separately displayed in divided areas of the chat room group display screen, and each of the divided areas is adjustable in size.

The chat room list displayed on the screen is a list of chat rooms having a high degree of similarity with a specific chat room.

The method may further include displaying an integrated search graphical user interface (GUI) for integratively searching for conversation content of the plurality of chat rooms.

Conversation content of each of the chat rooms displayed on the chat room group display screen may be copiable and transferrable to others of the chat rooms.

According to an aspect of the inventive concept, there is provided a user terminal including a communicator configured to communicate with an external device, a user input part configured to receive an input of a user, a display configured to display information, and a processor configured to acquire, in response to a gesture input received for a specific chat room in a chat room list displayed on a screen of the display, a list of similar chat rooms having a high degree of similarity with the specific chat room in the chat room list and control the display to display the similar chat room list.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
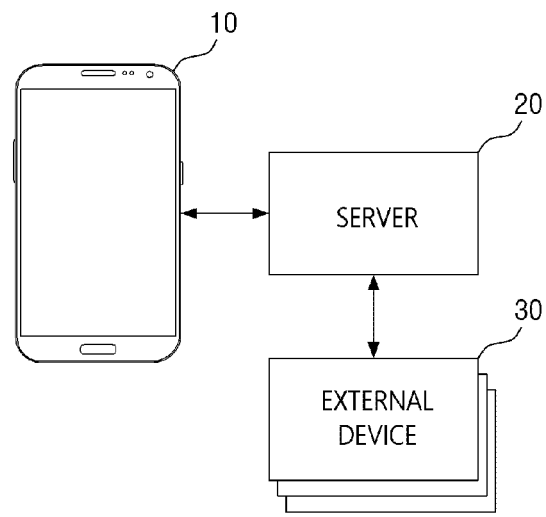
FIG. 1 is a diagram showing a configuration of a system according to an exemplary embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram showing a configuration of a system according to an exemplary embodiment of the present disclosure. Referring to FIG. 1, the system according to the exemplary embodiment of the present disclosure includes a user terminal 10, a server 20, and a plurality of external devices 30.

The user terminal 10 is a device providing an environment in which applications, such as a messenger program and the like, may be installed and executed. The user terminal 10 may be implemented as a display device, such as a smart phone, a tablet, a personal computer (PC), a laptop, etc. Like the user terminal 10, the external devices 30 may also be implemented as display devices, such as smart phones, tablets, PCs, laptops, etc.

The server 20 may be implemented as a server that is connected to the user terminal 10 and the plurality of external devices 30 via a network and provides a messenger service. The server 20 may receive conversation content input in a chat room from the user terminal 10 and transmit the received conversation content to some of the plurality of external devices 30. Also, the server 20 may receive conversation content input in a chat room from some of the external devices 30 and provide the received conversation content to the user terminal 10. The server 20 may store information and history related to conversation content of a chat room among the user terminal 10 and the plurality of external devices 30.

In the shown configuration, the user terminal 10 may display a chat room list on the screen by executing a messenger program of which the service is provided by the server 20.

The user terminal 10 may provide a function of displaying a list of chat rooms similar to a specific chat room when the specific chat room is selected in the chat room list displayed on the screen.

According to an exemplary embodiment, when a gesture input is received for the specific chat room in the chat room list displayed on the screen, the user terminal 10 may acquire a list of similar chat rooms having a high degree of similarity with the specific chat room in the chat room list. According to the exemplary embodiment, the similar chat rooms are chat rooms having a higher degree of similarity with the selected chat room than a preset reference degree of similarity The list of similar chat rooms having a high degree of similarity with the specific chat room may be analyzed and provided by the server 20 or may be analyzed by the user terminal 10 using histories of chat rooms stored in the user terminal 10.

The user terminal 10 may display the similar chat room list which is acquired as described above on the screen. In this case, the similar chat room list may be displayed adjacent to the lower end of the specific chat room.

As described above, the configuration of the system according to the exemplary embodiment of the present disclosure may collectively show chat rooms including desired main conversation content or collectively show chat rooms having similar conversational context and participant information to a chat room specified by a user in a chat room list of a messenger.

Figure 2:
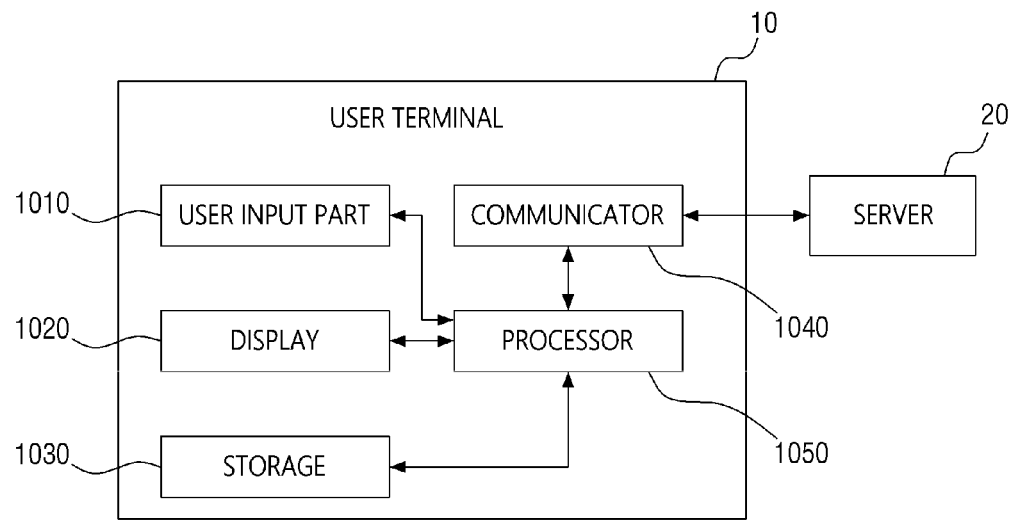
FIG. 2 is a block diagram showing a configuration of a user terminal according to an exemplary embodiment of the present disclosure.

FIG. 2 is a block diagram showing a configuration of a user terminal according to an exemplary embodiment of the present disclosure. Referring to FIG. 2, the user terminal 10 according to the exemplary embodiment of the present disclosure includes a communicator 1040, a display 1020, a storage 1030, a user input part 1010, and a processor 1050 and may communicate with the server 20 through the communicator 1040.

The communicator 1040 communicates with the server 20 using a wired or wireless communication method. The communicator 1040 may communicate with the server 20 using a wired communication method, such as Ethernet or the like, or may communicate with the server 20 using a mobile communication network or a wireless communication method, such as WiFi, Bluetooth, etc. A communication method of the communicator 1040 is not limited thereto, and another communication method may be used for communication.

The display 1020 displays information. For example, the display 1020 may render and display information received from the server 20 and information displayed by an application program installed on the user terminal 10. The display 1020 may be implemented in various forms, such as a plasma display panel (PDP), a liquid crystal display (LCD), an organic light emitting diode (OLED) display, a flexible display, etc.

The user input part 1010 receives a user input. For example, the user input part 1010 may receive a user input for selecting a menu or item in a user interface displayed on the display 1020 or selecting a part of displayed content. The user input part 1010 may be implemented as a touchscreen provided in the user terminal 10 or a keyboard, a mouse, etc. which is connected to the user terminal 10.

The storage 1030 may store and manage conversation content input in chat rooms of the messenger program displayed on the screen of the user terminal 10 and history information of each chat room.

When a gesture input is received for a specific chat room in a chat room list of the messenger program displayed on the screen of the display 1020, the processor 1050 may obtain a list of similar chat rooms having a high degree of similarity with the specific chat room in the chat room list. The processor 1050 may obtain the list of similar chat rooms by analyzing chat rooms having a high degree of similarity with the specific chat room by itself, or after the server 20 performs the analysis, the processor 1050 may only receive the result.

According to an exemplary embodiment, the processor 1050 may calculate a similarity index, which represents the degree of similarity with the specific chat room, for each chat room included in the chat room list and extract similar chat rooms having a high degree of similarity with the specific chat room using the calculated similarity indices. The process of calculating the similarity indices and extracting the similar chat rooms may be performed by the server 20 rather than the processor 1050, and the result may be provided to the user terminal 10.

According to an exemplary embodiment, the similarity indices may be calculated by analyzing one or more items among conversation content, user participation, participant similarity, and recent activity history and may be calculated by giving different weights to the one or more items.

According to an exemplary embodiment, the processor 1050 may display the similar chat room list acquired as described above on the screen of the display 1020 adjacent to the lower end of the specific chat room.

When displaying the similar chat room list, the processor 1050 may display a similarity index of each similar chat room in combination with information related to the conversation content, the user participation, the participant similarity, the recent activity history, etc. analyzed for similarity index calculation. Also, when displaying the similar chat room list, the processor 1050 may display similar chat rooms arranged on the basis of the calculated similarity indices. For example, the larger the similarity index, the higher the corresponding chat room is displayed in the similar chat room list, and the smaller the similarity index, the lower the corresponding chat room is displayed in the similar chat room list.

According to an exemplary embodiment, when one similar chat room is selected in the similar chat room list displayed on the screen, the processor 1050 may display main conversation content of the selected similar chat room in a separate popup area. Here, the processor 1050 may analyze a conversational pattern of the similar chat room using conversation types and conversation frequencies of all participants in the selected similar chat room, extract the main conversation content on the basis of the analyzed conversational pattern, and display the extracted main conversation content in the popup area. For example, conversational patterns of similar chat rooms may be classified into a notification and aggregation type, a business report type, a question-and-answer type, and a file transmission type. It may be analyzed which one of the types corresponds to a conversational pattern of each similar chat room, and then main conversation content may be extracted according to the conversational pattern.

According to an exemplary embodiment, when extracting the main conversation content of the selected similar chat room, the processor 1050 may classify terms not related to business, slang, and meaningless answers in the entire conversation content into a blacklist and exclude the blacklist from the main conversation content. Also, the processor 1050 may classify schedules, referential people, and conversations of main members in the entire conversation content of the similar chat room into a whitelist and include the whitelist in the main conversation content.

When at least one chat room is selected in the similar chat room list, the processor 1050 may display a graphical user interface (GUI) for performing an additional function on the selected at least one similar chat room. The additional function may include deselection, save, and bookmark functions for the selected similar chat room.

According to an exemplary embodiment, when a gesture input for a specific chat room is received while the similar chat room list is displayed, the processor 1050 may stop displaying the similar chat room list.

According to an exemplary embodiment, when a plurality of similar chat rooms are selected in the similar chat room list, the processor 1050 may generate a similar group chat room including the selected plurality of similar chat rooms and control the display 1020 to display the similar group chat room in the similar chat room list. Also, when the similar group chat room displayed in the similar chat room list is selected, the processor 1050 may perform control so that the plurality of similar chat rooms are separately displayed in divided areas on the single screen. In other words, when a user selects a plurality of similar chat rooms and one group chat room is generated, the selected plurality of similar chat rooms may be separately displayed in divided areas of the screen so that conversation content of all the plurality of similar chat rooms selected by the user is shown on the single screen if the user enters the group chat room.

With the above-described configuration of the user terminal 10 according to the exemplary embodiment of the present disclosure, it is possible to provide a convenient interface for collectively examining chat rooms having similar conversational context and participant information through one interaction, and accordingly, it is possible to readily understand the purpose, the main conversation, and the flow of conversations of each chat room. Also, a user can make a group by selecting chat rooms and rapidly search the several chat rooms in one screen.

Figure 3:
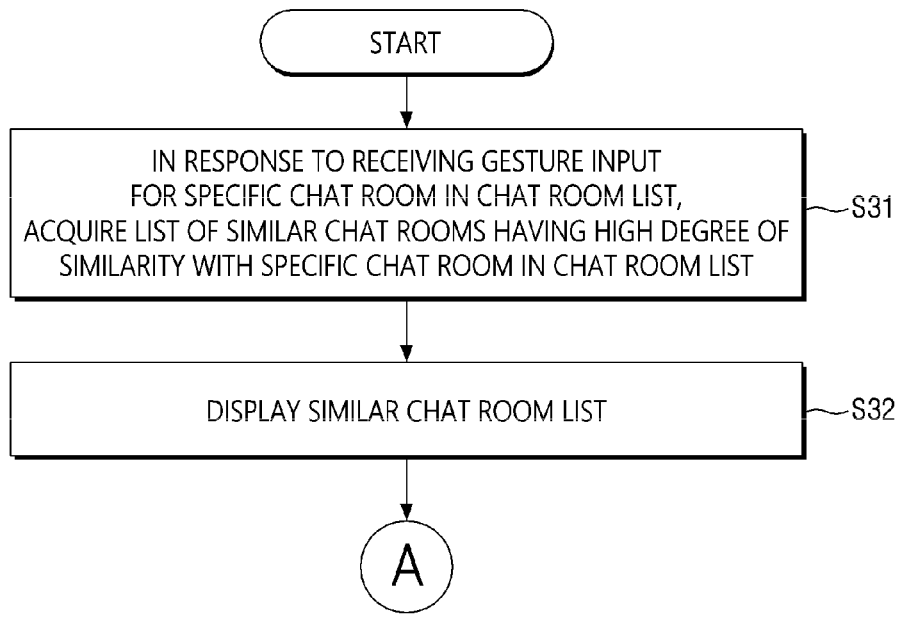
FIGS. 3 to 5 are flowcharts illustrating a method of displaying similar chat rooms according to another exemplary embodiment of the present disclosure.
Figure 4:
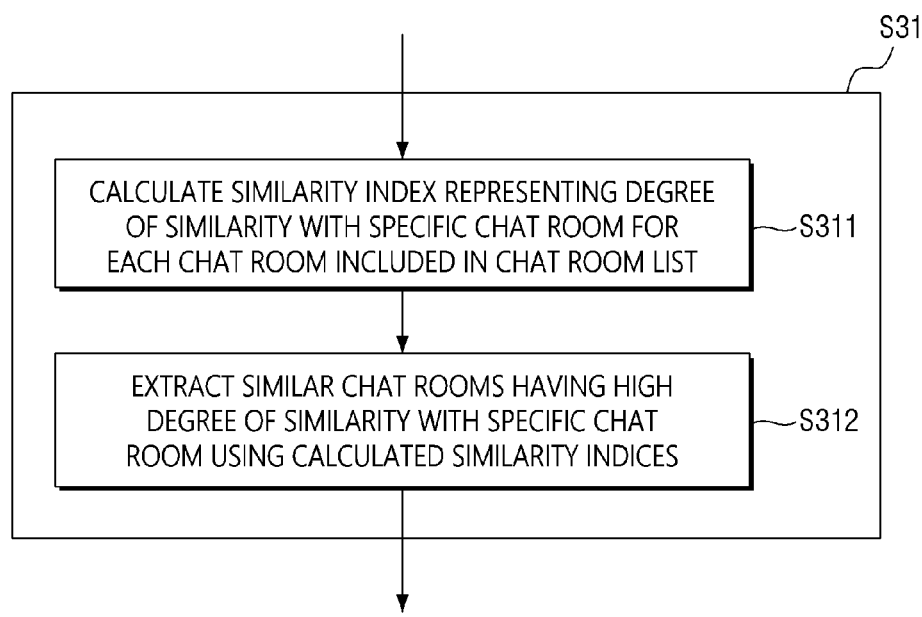
Figure 5:
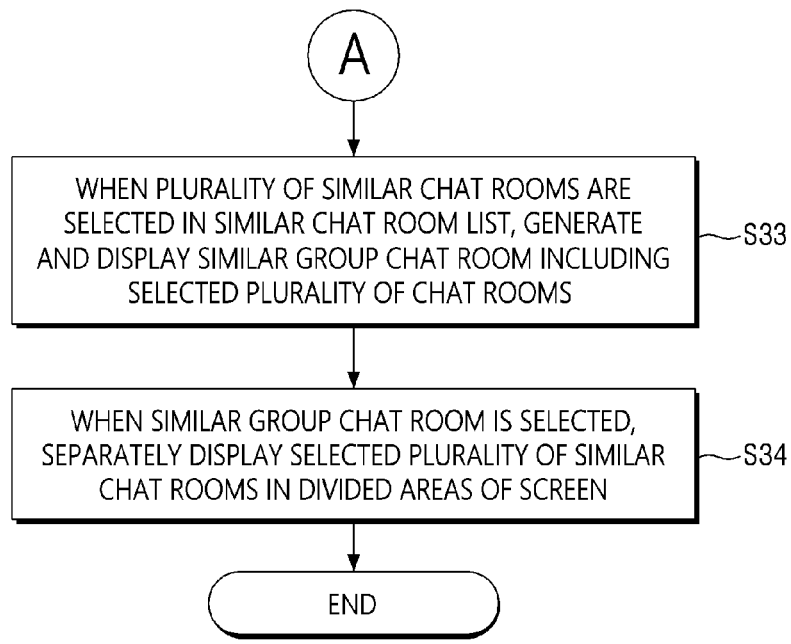

FIGS. 3 to 5 are flowcharts illustrating a method of displaying similar chat rooms according to another exemplary embodiment of the present disclosure.

The method of displaying similar chat rooms according to the exemplary embodiment of the present disclosure may be performed by a computing device 100, for example, the user terminal 10 of FIG. 1. The computing device 100 which performs the method according to the present embodiment may be a computing device having an application program execution environment. In some operations included in the method according to the exemplary embodiment of the present disclosure, a subject that performs the operations may not be indicated. In this case, it is to be noted that the subject is the computing device 100.

Referring to FIG. 3, in operation S31, when a gesture input is received for a specific chat room in a chat room list displayed on a screen, a list of similar chat rooms having a high degree of similarity with the specific chat room in the chat room list is acquired first. The gesture input may be a long click input for content or may be set to a type of input other than a long click input according to a user's setting.

Subsequently, in operation S32, the acquired similar chat room list is displayed on the screen.

Referring to FIG. 4, operation S31 may include operation S311 of calculating a similarity index, which represents the degree of similarity with the specific chat room, for each chat room included in the chat room list and operation S312 of extracting chat rooms having a high degree of similarity with the specific chat room using the calculated similarity indices. The similarity indices may be calculated through a preset similarity calculation algorithm.

According to an exemplary embodiment, the similarity calculation algorithm may be generated using four types of similarity indices, which may include, for example, a content similarity index, a user participation index, a participant similarity index, and a recent activity history index.

Each of the similarity indices will be described. The content similarity index is an index obtained by considering text content of a chat room as one document and quantifying a chat room similar to the corresponding chat room using a term frequency-inverse document frequency (TF-IDF) algorithm which is a text mining technique. The larger the degree of similarity, the higher the similar chat room may be displayed in the similar chat room list. A TF-IDF is a statistical number that represents how important a certain word is in a specific document and may be used for extracting a keyword or measuring the degree of similarity between documents.

The user participation index is an index generated for each day from a time point at which a chat room is generated on the basis of the number of times that a user enters the chat room and the number of inputs of the user to the chat room. The larger the user participation index, the higher the similar chat room may be displayed in the similar chat room list.

Meanwhile, the participant similarity index is an index that represents the degree of similarity among participants in chat rooms. The larger the number of participants determined to be the same through correlation coefficient analysis, the higher the degree of correlation between the chat rooms is considered, and the higher a similar chat room may be displayed in the similar chat room list.

Finally, the recent activity history index is an index obtained by measuring whether the number of recent conversations is larger than the number of past conversations or whether the latter is larger than the former through the activity history of a participant in a chat room. The recent activity history index may be calculated by standardizing the median of daily chat room data. In other words, a chat room with more recent conversations may be viewed as having a high recent activity history index and displayed higher in the similar chat room list.

According to an exemplary embodiment, a final similarity index may also be calculated by giving different weights to the above-described four similarity indices. For example, when the content similarity index, the user participation index, the participant similarity index, and the recent activity history index are given as 0.4, 0.3, 0.2, and 0.1, respectively, a final similarity index may be calculated as (content similarity index×0.4)+(user participation index×0.3)+(participant similarity index×0.2)+(recent activity history index× 0.1).

According to an exemplary embodiment, operation S32 may include an operation of displaying a similarity index for each similar chat room in combination with information on items analyzed for calculating the similarity index. For example, an activity index (M/the total number of conversations), a user participation (%), the number of similar main words (N), etc. may be displayed together with the similarity index for each similar chat room in the similar chat room list.

Referring to FIG. 5, in operation S33, when a plurality of similar chat rooms are selected in the similar chat room list, a similar group chat room including the selected plurality of chat rooms may be generated and displayed. For example, the user may select a desired plurality of chat rooms in the similar chat room list and group and display the selected plurality of chat rooms as one group chat room in the similar chat room list.

In operation S34, when the similar group chat room is selected, the selected plurality of similar chat rooms may be separately displayed in divided areas of the screen.

For example, when the user enters the group chat room obtained by selecting and grouping the plurality of similar chat rooms, all the selected multiple similar chat rooms may be displayed on the single screen.

Accordingly, the user can check all conversation content of the chat rooms selected by the user on the single screen. Therefore, a rapid search is allowed, and it is possible to select and copy conversation content wanted by the user and immediately transfer the conversation content to another chat room without a screen change. Also, an integrated search for a chat room selected by the user can be easily provided on the single screen.

Figure 6:
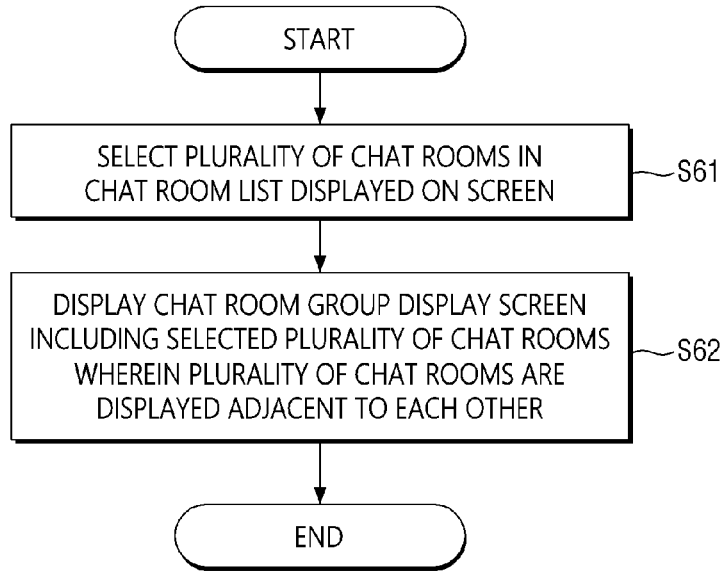
FIG. 6 is a flowchart illustrating a method of displaying a chat room group according to still another exemplary embodiment of the present disclosure.

FIG. 6 is a flowchart illustrating a method of displaying a chat room group according to still another exemplary embodiment of the present disclosure.

The method of displaying a chat room group according to the exemplary embodiment of the present disclosure may be performed by the computing device 100 or the user terminal 10 of FIG. 1. The computing device 100 which performs the method according to the present embodiment may be a computing device having an application program execution environment. In some operations included in the method according to the exemplary embodiment of the present disclosure, a subject that performs the operations may not be indicated. In this case, it is to be noted that the subject is the computing device 100.

Referring to FIG. 6, in operation S61, a plurality of chat rooms are selected first in a chat room list displayed on a screen. Subsequently, in operation S62, a chat room group display screen including the selected plurality of chat rooms is displayed. Here, in the chat room group display screen, the plurality of chat rooms are displayed adjacent to each other.

According to an exemplary embodiment, in the chat room group display screen, the plurality of chat rooms are separately displayed in divided areas of the screen, each of which may be adjusted in size.

According to an exemplary embodiment, operation S61 may include an operation of selecting a plurality of chat rooms in a list of chat rooms having a high degree of similarity with a specific chat room. Here, when there is a gesture input of a user for the specific chat room, the list of chat rooms having a high degree of similarity with the specific chat room is displayed, and a plurality of chat rooms may be selected in the list of chat rooms.

According to an exemplary embodiment, the method may further include an operation of displaying an integrated search GUI for integratively searching for conversation content of the plurality of chat rooms. For example, while the plurality of chat rooms are displayed in the chat room group display screen, an integrated search GUI, such as an integrated search bar or an integrated search window, may be additionally displayed, and thereby it is possible to integratively search conversation content included in the plurality of chat rooms.

Also, conversation content of each chat room displayed in the chat room group display screen may be copied and transferred to another chat room. Accordingly, it is possible to rapidly search several chat rooms in the single screen and efficiently perform a task by finding desired conversation content.

Figure 7:
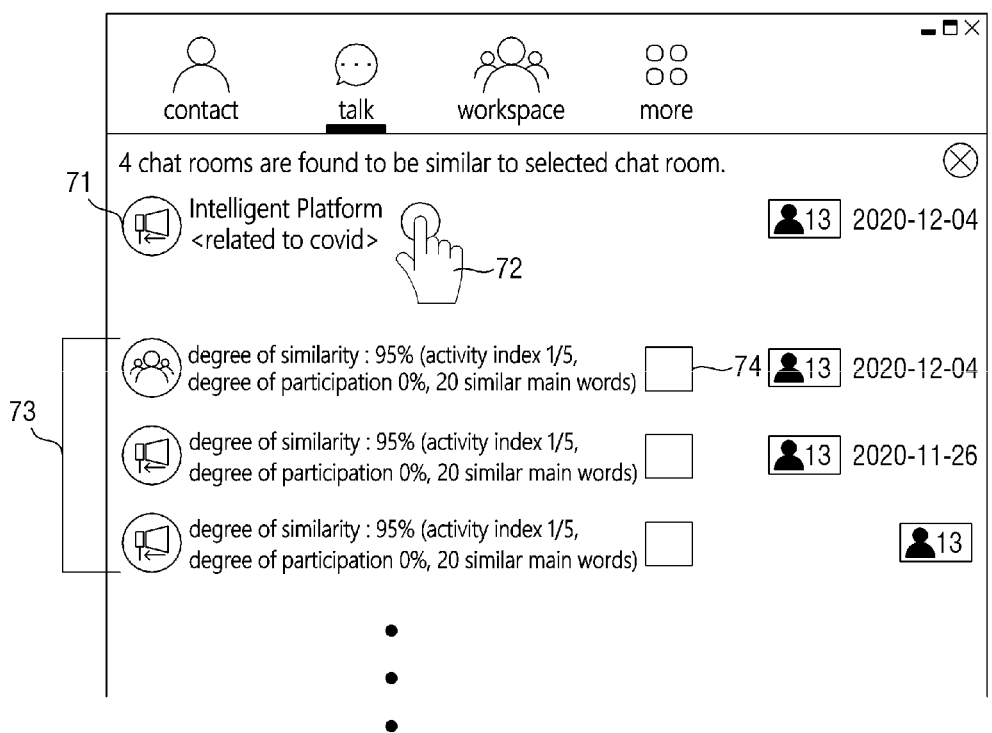
FIG. 7 illustrates an example of switching to an examination mode in which similar chat rooms are collectively shown according to some exemplary embodiments of the present disclosure.

FIG. 7 illustrates an example of switching to an examination mode in which similar chat rooms are collectively shown according to some exemplary embodiments of the present disclosure.

Referring to FIG. 7, when a long click input 72 is received for a specific chat room 71 in a chat room list displayed on the screen, the user terminal 10 may switch to an examination mode of collectively showing chat rooms similar to the specific chat room 71 among chat rooms included in the chat room list. The user terminal 10 may extract chat rooms similar to the specific chat room 71 in the examination mode and display the extracted similar chat rooms 73 in the chat room list. For example, the same chat room name, the same participant ratio, the same conversational topic, etc. may be used as criteria for extracting similar chat rooms.

According to an exemplary embodiment, the user terminal 10 may extract similar chat rooms having a high degree of similarity through similarity analysis based on, for example, conversation content, user participation, participant similarity, recent activity history, etc. and generate the similar chat room list 73. Extracting the similar chat rooms may be directly performed by the user terminal 10 or may be performed by the server 20 and then the result may be provided.

In the example shown in the drawing, when displaying the similar chat room list 73 in the examination mode, the user terminal 10 may display the number of similar chat rooms at the upper end of the chat room list. Also, a check box 74 may be displayed on the right of each similar chat room included in the similar chat room list 73 such that each similar chat room may be selected.

Figure 8:
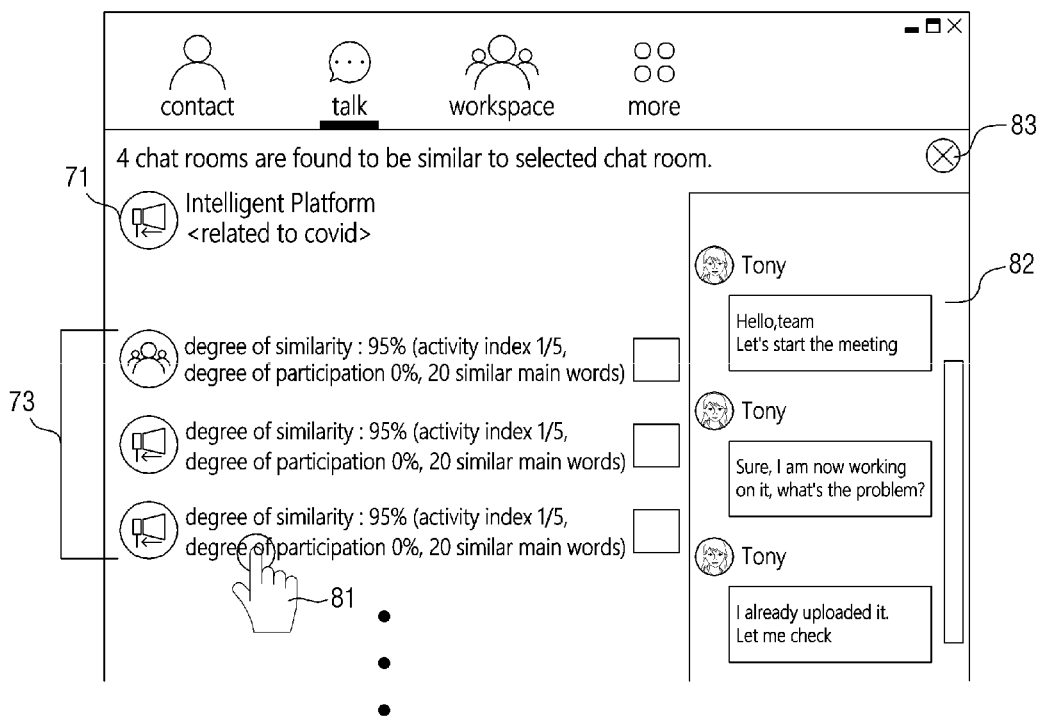
FIG. 8 illustrates an example of displaying a main conversation of a similar chat room as a popup according to some exemplary embodiments of the present disclosure.

FIG. 8 illustrates an example of displaying a main conversation of a similar chat room as a popup according to some exemplary embodiments of the present disclosure.

Referring to FIG. 8, when one similar chat room is selected in the similar chat room list 73, in which the chat rooms similar to the specific chat room 71 are collectively displayed, by a click input 81, the user terminal 10 may automatically extract main conversation content of the selected similar chat room and display the extracted conversation content in a separate popup area 82. In this case, the main conversation content displayed in the popup area 82 may be automatically scrolled.

According to an exemplary embodiment, the main conversation content may be extracted on the basis of a conversation pattern, which is analyzed using conversation types and conversation frequencies of all participants in the selected similar chat room.

Also, the main conversation content displayed in the popup area 82 may include a conversation including main terms or a conversation for understanding the overall context among conversations held in the selected similar chat room.

In the example shown in the drawing, when an X button 83 is pressed or the specific chat room 71 is long clicked again in the examination mode in which the similar chat room list 73 is shown, the user terminal 10 may be switched from the examination mode such that display of the similar chat room list 73 may be stopped.

Figure 9:
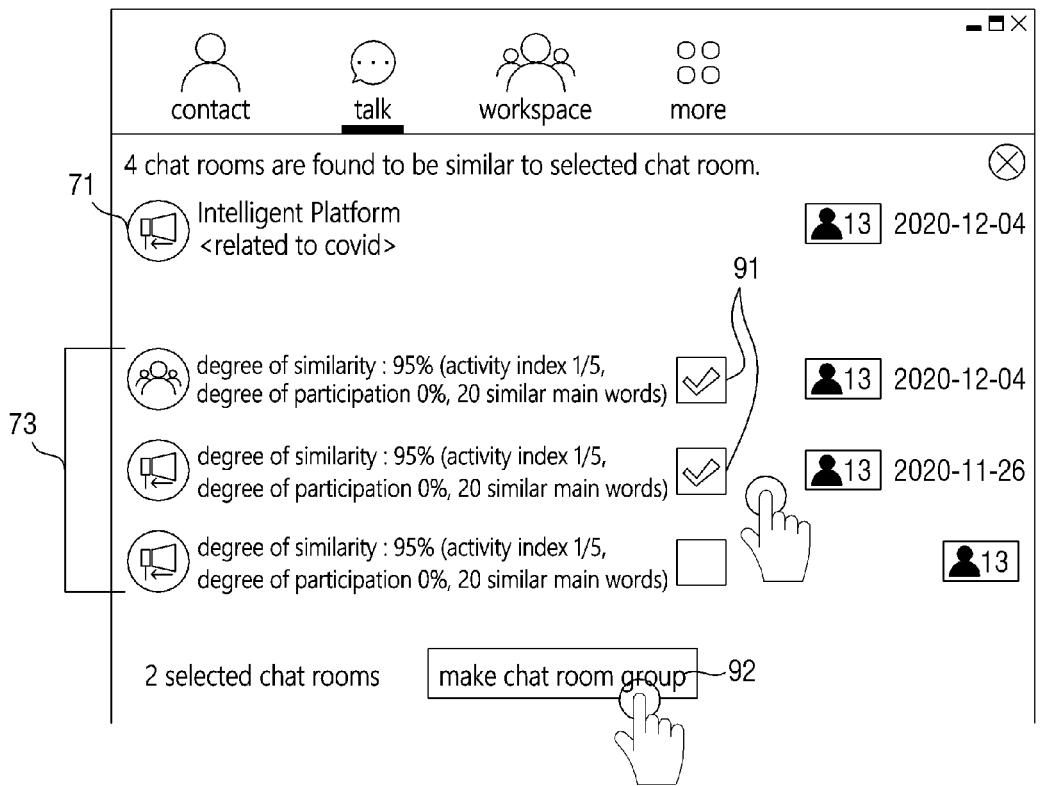
FIGS. 9 and 10 are an example of generating one group chat room by selecting a plurality of chat rooms according to some exemplary embodiments of the present disclosure.
Figure 10:
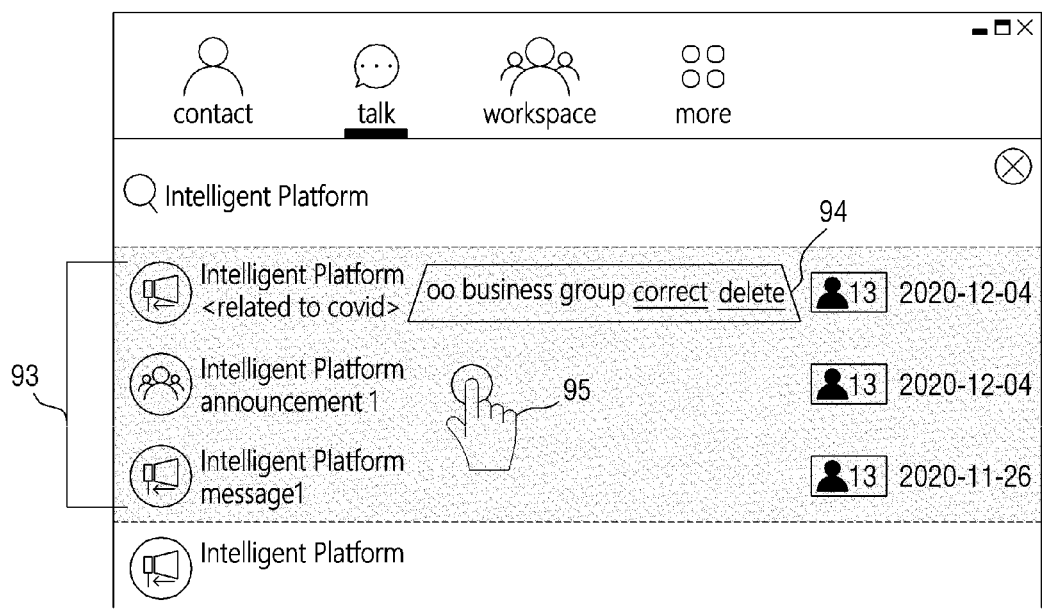

FIGS. 9 and 10 are an example of generating one group chat room by selecting a plurality of chat rooms according to some exemplary embodiments of the present disclosure.

Referring to FIG. 9, when a plurality of similar chat rooms included in the similar chat room list 73 are selected while the similar chat room list 73 is displayed in the examination mode, the user terminal 10 may generate one group chat room 93 (see FIG. 10).

In the example shown in the drawing, when two upper similar chat rooms in the similar chat room list 73 are selected 91 using check boxes and a "Make a chat room group" button is clicked 92, one logical group chat room 93 may be generated by grouping the specific chat room 71 and the selected two similar chat rooms. The generated group chat room 93 is not obtained by physically integrating participants and conversation content of the chat rooms but may be used only by the user of the user terminal 10 to process business as if it were one chat room.

Referring to FIG. 10, the user terminal 10 may display the group chat room 93 which is generated by selecting a plurality of chat rooms similar to the specific chat room 71 in the chat room list. Here, a name 94 of the group chat room 94 may be implemented to be correctable or deletable. In the example shown in the drawing, the user terminal 10 may display a conversation screen of the group chat room 93 when the group chat room 93 is clicked 95.

Figure 11:
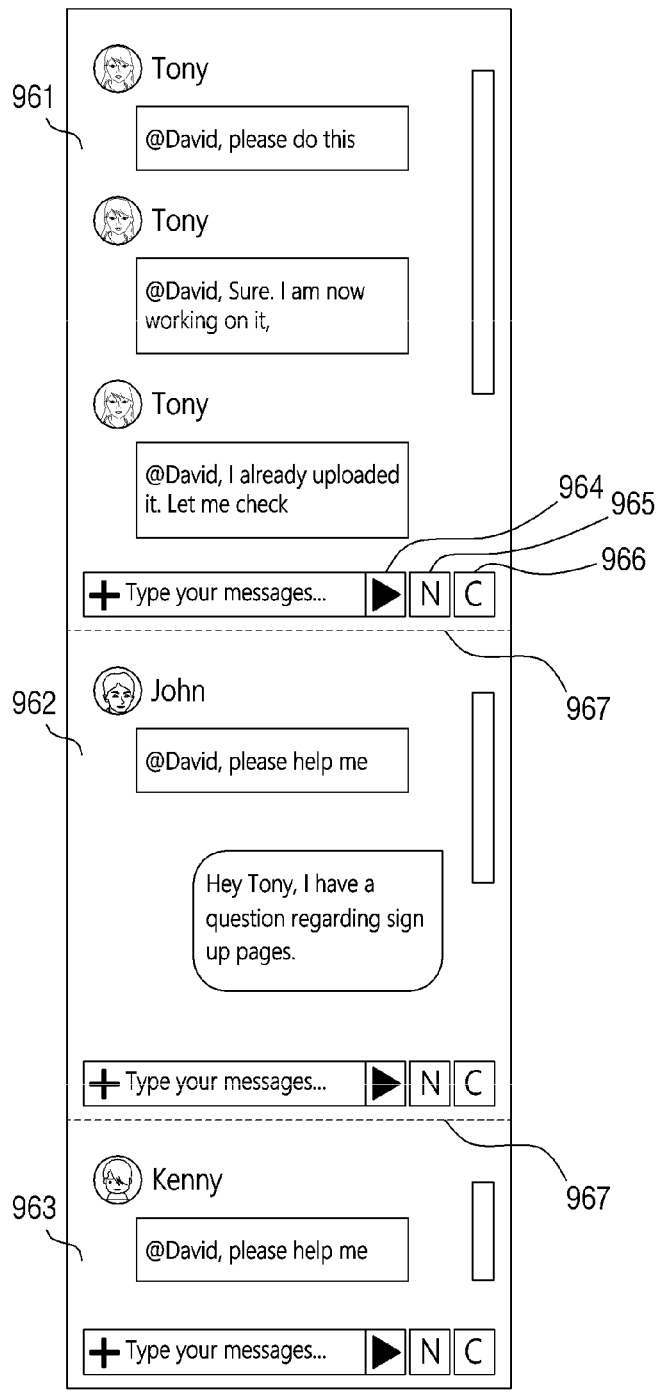
FIGS. 11 and 12 are examples of a screen interface in which group chat rooms are displayed according to some exemplary embodiments of the present disclosure.
Figure 12:
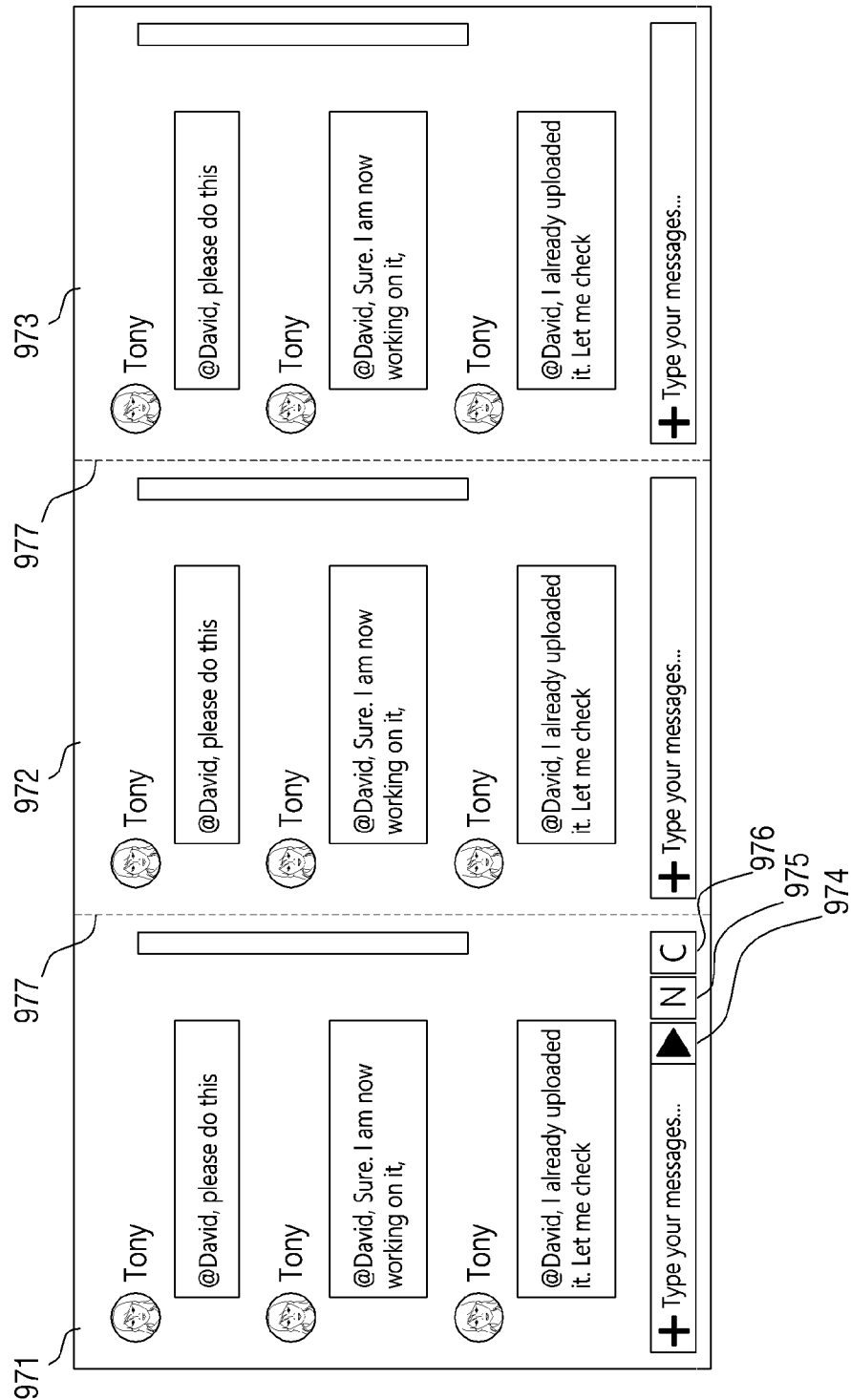

Referring to FIGS. 11 and 12, the conversation screen of the group chat room 93 may be implemented as one screen interface for displaying all the plurality of similar chat rooms selected by the user.

In the example shown in FIG. 11, a conversation screen of the group chat room 93 may separately show the selected plurality of similar chat rooms in areas 961, 962, and 963 obtained by vertically dividing the single screen. The similar chat rooms separately displayed in the divided areas 961, 962, and 963 may be stuck together on the basis of boundaries 967.

The divided areas 961, 962, and 963 in which the similar chat rooms are separately displayed may be increased or decreased in size and arranged in various forms, such as a vertical arrangement, a horizontal arrangement, a grid arrangement, etc.

According to an exemplary embodiment, in the conversation screen of the group chat room 93, conversation content may be copied and transferred between the similar chat rooms separately displayed in the divided areas 961, 962, and 963. For example, an input icon 964, a focus movement icon 965, and a copy icon 966 may be displayed in an input window of each similar chat room. When the input icon 964 is selected, conversation content input to the input window may be additionally displayed in the screen of the chat room. When the focus movement icon 965 is selected in the input window of the chat room displayed in the first area 961, the focus may be moved to the input window of the second area 962 adjacent to the lower end of the first area 961. Also, when the copy icon 966 is selected, conversation content input to the input window of the first area 961 may be copied and pasted to the input windows of the second area 962 and the third area 963 at once.

Accordingly, the user can see all the plurality of chat rooms in the single screen, and thus it is possible to rapidly search for desired conversation content. For example, a counselor can make a group chat room with consulters having the same problem and give rapid and consistent answers.

Referring to FIG. 12, the conversation screen of the group chat room 93 may separately show a selected plurality of similar chat rooms in areas 971, 972, and 973 obtained by horizontally dividing the single screen. The similar chat rooms separately displayed in the divided areas 971, 972, and 973 may be stuck together on the basis of boundaries 977.

According to an exemplary embodiment, in the conversation screen of the group chat room 93, conversation content may be copied and transferred between the similar chat rooms separately displayed in the divided areas 971, 972, and 973. For example, an input icon 974, a focus movement icon 975, and a copy icon 976 may be displayed in an input window of each similar chat room. When the input icon 974 is selected, conversation content input to the input window may be additionally displayed in the screen of the chat room. When the focus movement icon 975 is selected in the input window of the chat room displayed in the first area 971, the focus may be moved to the input window of the second area 972 adjacent to the right end of the first area 971. Also, when the copy icon 976 is selected, conversation content input to the input window of the first area 971 may be copied and pasted to the input windows of the second area 972 and the third area 973 at once.

Figure 13:
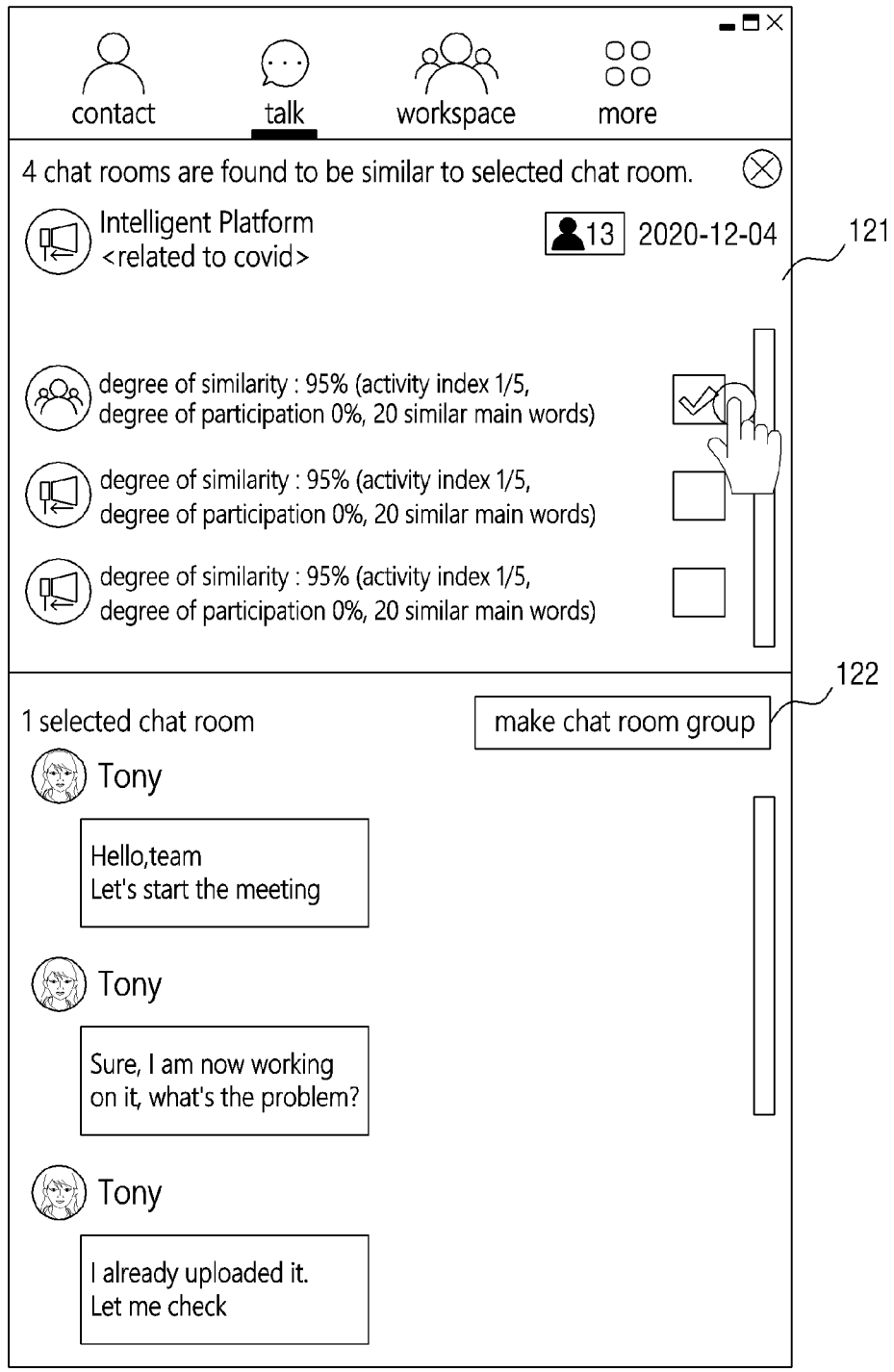
FIG. 13 is an example of a mobile device screen collectively showing similar chat rooms according to some exemplary embodiments of the present disclosure.

FIG. 13 is an example of a mobile device screen collectively showing similar chat rooms according to some exemplary embodiments of the present disclosure. In the example shown in the drawing, when the user terminal 10 is a mobile device, such as a smart phone, an examination area 121 for displaying a similar chat room list may be displayed in the upper portion of the screen, and a search area 122 for displaying main conversation content of similar chat rooms selected in the similar chat room list may be displayed in the lower portion of the screen.

Figure 14:
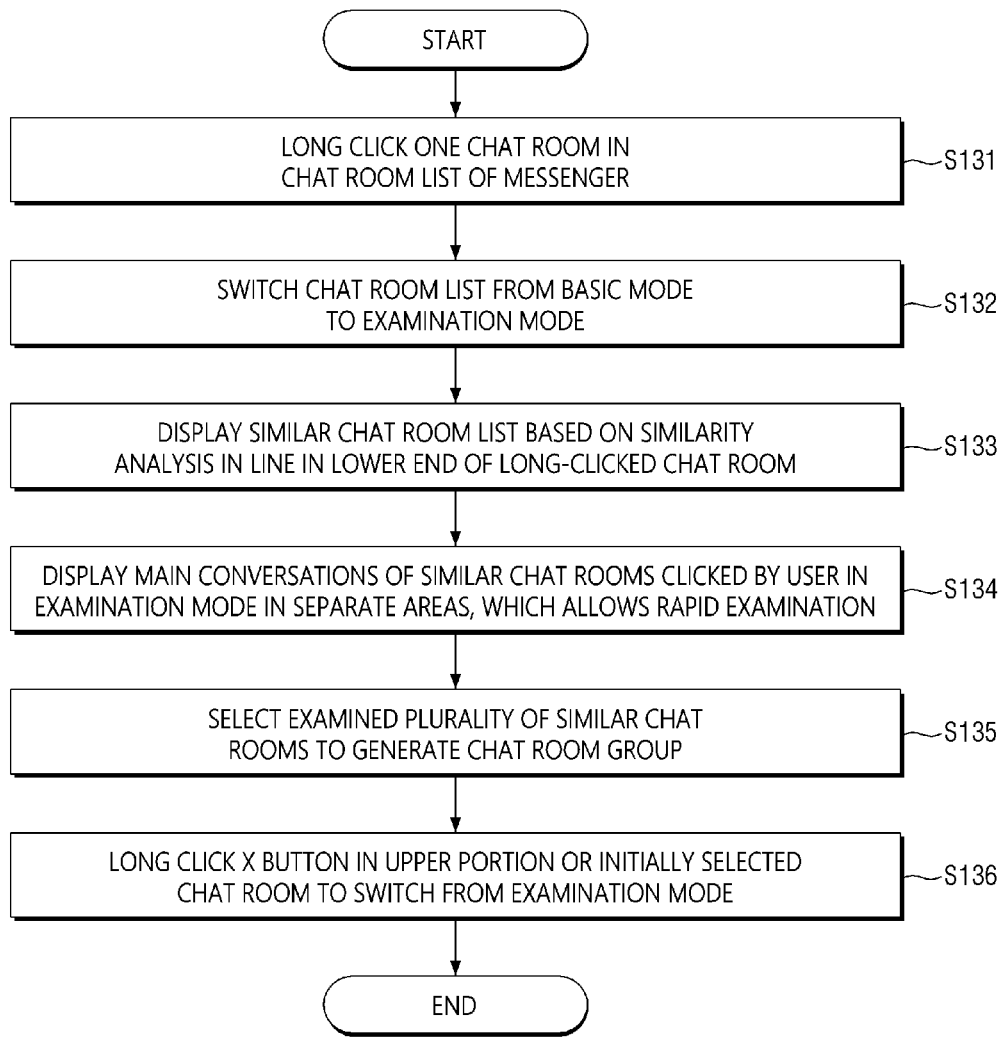
FIG. 14 is an example of a user interaction flow according to some exemplary embodiments of the present disclosure.

FIG. 14 is an example of a user interaction flow according to some exemplary embodiments of the present disclosure. Referring to FIG. 14, first, when one specific chat room is long clicked in a chat room list of a messenger in operation S131, the chat room list is switched from a basic mode to an examination mode in operation S132.

Subsequently, in operation S133, a similar chat room list based on similarity analysis is displayed in line in a lower portion of the specific chat room which has been long clicked.

Subsequently, in operation S134, when one similar chat room is clicked by the user in the examination mode, main conversation content is displayed in a separate area, which allows rapid examination. In operation S135, when an examined plurality of similar chat rooms are selected, a chat room group is generated.

Finally, in operation S136, an X button in the upper portion of the screen or the initially selected chat room is long clicked to switch from the examination mode.

Figure 15:
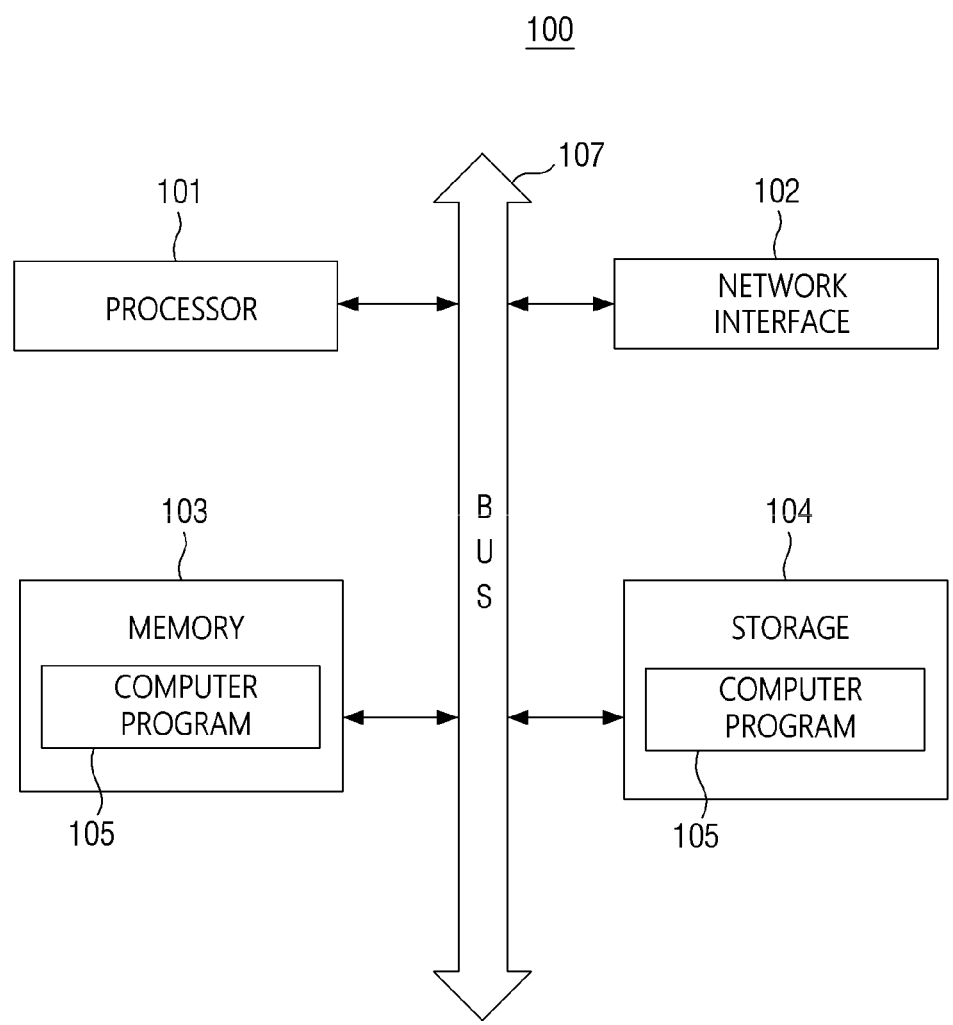
FIG. 15 is a diagram showing a hardware configuration of an exemplary computing device for implementing the methods according to some exemplary embodiments of the present disclosure.

FIG. 15 is a hardware configuration diagram of an exemplary computing device 500.

Referring to FIG. 15, the computing device 100 may include one or more processors 101, a bus 107, a network interface 102, a memory 103, which loads a computer program 105 executed by the processors 101, and a storage 104 for storing the computer program 105. However, FIG. 15 illustrates only the components related to the embodiment of the present disclosure. Therefore, it will be appreciated by those skilled in the art that the present disclosure may further include other general purpose components in addition to the components shown in FIG. 15.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to include a communication module well known in the art of the present disclosure.

The storage 104 can non-temporarily store one or more computer programs 105. The storage 104 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as interne and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method of displaying similar chat rooms, the method performed by a user terminal, the method comprising:
receiving a gesture input received for selecting a chat room in a chat room list displayed on a screen;
in response to the gesture input, acquiring a list of similar chat rooms with the selected chat room in the chat room list, wherein the similar chat rooms are chat rooms having a higher degree of similarity with the selected chat room than a preset reference degree of similarity;
displaying the similar chat room list; and
when one similar chat room is selected in the similar chat room list, displaying main conversation content of the selected similar chat room in a separate popup area.

2. The method of claim 1, wherein the acquiring of the list of the similar chat rooms comprises:
calculating a similarity index, which represents a degree of similarity with the selected chat room, for each of chat rooms included in the chat room list; and
extracting the similar chat rooms having a higher degree of similarity with the selected chat room than the preset reference degree, using the calculated similarity indices.

3. The method of claim 2, wherein the similarity indices are calculated by analyzing one or more items among conversation content, user participation, participant similarity, and recent activity history.

4. The method of claim 3, wherein the similarity indices are calculated by giving different weights to the one or more items.

5. The method of claim 3, wherein the displaying of the similar chat room list comprises displaying the similarity index for each of the similar chat rooms in combination with information on the one or more items analyzed for calculating the similarity index.

6. The method of claim 1, wherein the displaying of the similar chat room list comprises displaying the similar chat room list adjacent to a lower end of the selected chat room.

7. The method of claim 1, wherein the displaying of the main conversation content of the selected similar chat room in the separate popup area comprises:
analyzing a conversation pattern of the selected similar chat room using conversation types and conversation frequencies of all participants of the selected similar chat room; and extracting the main conversation content on the basis of the analyzed conversation pattern.

8. The method of claim 7, wherein the conversation pattern of the similar chat room is classified into a notification and aggregation type, a business report type, a question-and-answer type, or a file transmission type.

9. The method of claim 1, wherein the displaying of the main conversation content of the selected similar chat room in the separate popup area comprises:
classifying a term which is not related to business, slang, and a meaningless answer in entire conversation content of the similar chat room into a blacklist; and
excluding the blacklist from the main conversation content.

10. The method of claim 1, wherein the displaying of the main conversation content of the selected similar chat room in the separate popup area comprises:
classifying schedules, referential people, and conversations of main members in entire conversation content of the similar chat room into a whitelist; and
including the whitelist in the main conversation content.

11. The method of claim 1, further comprising, when at least one similar chat room is selected in the similar chat room list, displaying a graphical user interface (GUI) for performing an additional function on the selected at least one similar chat room.

12. The method of claim 11, wherein the additional function includes deselection, save, and bookmark functions for the selected similar chat room.

13. The method of claim 1, further comprising, when a plurality of similar chat rooms are selected in the similar chat room list, generating and displaying a group chat room including the selected plurality of similar chat rooms.

14. A method of displaying a similar chat room group, the method performed by a user terminal, the method comprising:
in response to a chat room being selected in a chat room list displayed on a screen, displaying a list of similar chat rooms with the selected chat room in the chat room list, wherein the similar chat rooms are chat rooms having a higher degree of similarity with the selected chat room than a preset reference degree of similarity;
receiving an input for selecting a plurality of similar chat rooms in the list of similar chat rooms; and
generating and displaying a similar chat room group including the selected chat room and the selected plurality of similar chat rooms, wherein the selected chat room and the plurality of similar chat rooms are displayed connected to each other horizontally or vertically in the displayed similar chat room group,
wherein each of the plurality of similar chat rooms, in the displayed similar chat room group, shows messages transmitted from a plurality of members of the similar chat room.

15. The method of claim 14, wherein the plurality of similar chat rooms are separately displayed in divided areas of the displayed similar chat room group; and
each of the divided areas is adjustable in size.

16. The method of claim 14, further comprising displaying an integrated search graphical user interface (GUI) for integratively searching for conversation content of the plurality of similar chat rooms.

17. The method of claim 14, wherein conversation content of each of the plurality of similar chat rooms displayed on a similar chat room group is copiable and transferrable to others of the plurality of similar chat rooms.

18. A user terminal comprising:
a communicator configured to communicate with an external device;
a user input part configured to receive an input of a user;
a display configured to display information; and
a processor configured to receive a gesture input for selecting a first chat room in a chat room list displayed on a screen of the display, acquire, in response to the gesture input, a list of similar chat rooms, control the display to display the similar chat room list, and when one similar chat room is selected in the similar chat room list, display main conversation content of the selected similar chat room in a separate popup area,
wherein the similar chat rooms are chat rooms having a higher degree of similarity with the selected chat room than a preset reference degree of similarity.

* * * * *